US011403800B1

(12) United States Patent
Prokudin et al.

(10) Patent No.: US 11,403,800 B1
(45) Date of Patent: Aug. 2, 2022

(54) IMAGE GENERATION FROM 3D MODEL USING NEURAL NETWORK

(71) Applicant: Amazon Technologies, Inc., Seattle, WA (US)

(72) Inventors: Sergey Prokudin, Tubingen (DE); Javier Romero Gonzalez-Nicolas, Barcelona (ES); Michael Julian Black, Tubingen (DE)

(73) Assignee: Amazon Technologies, Inc., Seattle, WA (US)

( * ) Notice: Subject to any disclaimer, the term of this patent is extended or adjusted under 35 U.S.C. 154(b) by 204 days.

(21) Appl. No.: 16/927,518

(22) Filed: Jul. 13, 2020

(51) Int. Cl.
| | |
|---|---|
| *G06T 13/40* | (2011.01) |
| *G06T 19/00* | (2011.01) |
| *G06K 9/62* | (2022.01) |
| *G06V 10/56* | (2022.01) |
| *G06V 20/64* | (2022.01) |
| *G06V 40/10* | (2022.01) |

(52) U.S. Cl.
CPC ............ *G06T 13/40* (2013.01); *G06K 9/6257* (2013.01); *G06T 19/00* (2013.01); *G06V 10/56* (2022.01); *G06V 20/653* (2022.01); *G06V 40/103* (2022.01)

(58) Field of Classification Search
None
See application file for complete search history.

(56) References Cited

U.S. PATENT DOCUMENTS

| | | | |
|---|---|---|---|
| 10,395,411 B2 | 8/2019 | Black et al. | |
| 2012/0113129 A1* | 5/2012 | Rhee .................. | G06T 15/04 345/582 |
| 2016/0148425 A1* | 5/2016 | Hwang ................ | G06T 17/00 345/419 |
| 2019/0392626 A1 | 12/2019 | Black et al. | |

(Continued)

FOREIGN PATENT DOCUMENTS

AU        2017248506        *  9/2018

OTHER PUBLICATIONS

Aliev, K.A., Ulyanov, D., Lempitsky, V.: Neural point-based graphics. arXiv preprint arXiv:1906.08240 (2019).

(Continued)

*Primary Examiner* — Tapas Mazumder
(74) *Attorney, Agent, or Firm* — Knobbe, Martens, Olson & Bear, LLP

(57) ABSTRACT

Systems and methods are provided for generating an image of a posed human figure or other subject using a neural network that is trained to translate a set of points to realistic images by reconstructing projected surfaces directly in the pixel space or image space. Input to the image generation process may include parameterized control features, such as body shape parameters, pose parameters and/or a virtual camera position. These input parameters may be applied to a three-dimensional model that is used to generate the set of points, such as a sparsely populated image of color and depth information at vertices of the three-dimensional model, before additional image generation occurs directly in (Continued)

the image space. The visual appearance or identity of the synthesized human in successive output images may remain consistent, such that the output is both controllable and predictable.

20 Claims, 6 Drawing Sheets

(56) References Cited

U.S. PATENT DOCUMENTS

2021/0406596 A1* 12/2021 Hoffman .............. G06K 9/6261

OTHER PUBLICATIONS

Alldieck, T., Magnor, M., Bhatnagar, B.L., Theobalt, C., Pons-Moll, G.: Learning to reconstruct people in clothing from a single rgb camera. In: Proceedings of the IEEE Conference on Computer Vision and Pattern Recognition, pp. 1175{1186 (2019).
Alldieck, T., Magnor, M., Xu, W., Theobalt, C., Pons-Moll, G.: Detailed human avatars from monocular video. In: International Conference on 3D Vision, pp. 98-109 (Sep. 2018). https://doi.org/10.1109/3DV.2018.00022.
Anguelov, D., Srinivasan, P., Koller, D., Thrun, S., Rodgers, J., Davis, J.: Scape: shape completion and animation of people. In: ACM SIGGRAPH 2005 Papers, pp. 408-416 (2005).
Blanz, V., Vetter, T.: A morphable model for the synthesis of 3D faces. In: Proceedings of the 26th annual conference on Computer graphics and interactive techniques, pp. 187-194 (1999).
Bogo, F., Romero, J., Loper, M., Black, M.J.: FAUST: Dataset and evaluation for 3D mesh registration. In: Proceedings of the IEEE Conference on Computer Vision and Pattern Recognition, pp. 3794{3801 (2014).
Chan, C., Ginosar, S., Zhou, T., Efros, A.A.: Everybody dance now. In: Proceedings of the IEEE International Conference on Computer Vision, pp. 5933-5942 (2019).
Chen, L.C., Zhu, Y., Papandreou, G., Schroff, F., Adam, H.: Encoder-decoder with atrous separable convolution for semantic image segmentation. In: The European Conference on Computer Vision (ECCV) (Sep. 2018).
Chen, W., Hays, J.: SketchyGAN: Towards diverse and realistic sketch to image synthesis. In: Proceedings of the IEEE Conference on Computer Vision and Pattern Recognition, pp. 9416-9425 (2018).
Esser, P., Sutter, E., Ommer, B.: A variational u-net for conditional appearance and shape generation. In: Proceedings of the IEEE Conference on Computer Vision and Pattern Recognition, pp. 8857-8866 (2018).
Goodfellow, I., Pouget-Abadie, J., Mirza, M., Xu, B., Warde-Farley, D., Ozair, S., Courville, A., Bengio, Y.: Generative adversarial nets. In: Advances in neural information processing systems, pp. 2672-2680 (2014).
Hartley, R., Zisserman, A.: Multiple view geometry in computer vision. Cambridge university press (2003).
Hu, L., Bradley, D., Li, H., Beeler, T.: Simulation-ready hair capture. In: Computer Graphics Forum, vol. 36, pp. 281-294. Wiley Online Library (2017).
Isola, P., Zhu, J.Y., Zhou, T., Efros, A.A.: Image-to-image translation with conditional adversarial networks. In: Proceedings of the IEEE conference on computer vision and pattern recognition, pp. 1125-1134 (2017).
Johnson, J., Alahi, A., Fei-Fei, L.: Perceptual losses for real-time style transfer and super-resolution. In: European conference on computer vision, pp. 694-711. Springer (2016)—16 ECCV-20 submission ID 2757.
Joo, H., Simon, T., Sheikh, Y.: Total capture: A 3D deformation model for tracking faces, hands, and bodies. In: Proceedings of the IEEE conference on computer vision and pattern recognition, pp. 8320-8329 (2018).
Kanazawa, A., Black, M.J., Jacobs, D.W., Malik, J.: End-to-end recovery of human shape and pose. In: Proceedings of the IEEE Conference on Computer Vision and Pattern Recognition. pp. 7122-7131 (2018).
Karras, T., Laine, S., Aila, T.: A style-based generator architecture for generative adversarial networks. In: Proceedings of the IEEE Conference on Computer Vision and Pattern Recognition, pp. 4401-4410 (2019).
Karras, T., Laine, S., Aittala, M., Hellsten, J., Lehtinen, J., Aila, T.: Analyzing and improving the image quality of StyleGAN. arXiv preprint arXiv:1912.04958 (2019).
Kato, H., Ushiku, Y., Harada, T.: Neural 3D mesh renderer. In: Proceedings of the IEEE Conference on Computer Vision and Pattern Recognition, pp. 3907-3916 (2018).
Kobbelt, L., Botsch, M.: A survey of point-based techniques in computer graphics. Computers & Graphics 28(6), 801-814 (2004).
Kocabas, M., Athanasiou, N., Black, M.J.: Vibe: Video inference for human body pose and shape estimation. arXiv preprint arXiv:1912.05656 (2019).
Kolotouros, N., Pavlakos, G., Black, M.J., Daniilidis, K.: Learning to reconstruct 3D human pose and shape via model-_tting in the loop. In: Proceedings of the IEEE International Conference on Computer Vision, pp. 2252-2261 (2019).
Levoy, M., Whitted, T.: The use of points as a display primitive. Citeseer (1985).
Li, T., Bolkart, T., Black, M.J., Li, H., Romero, J.: Learning a model of facial shape and expression from 4d scans. ACM Transactions on Graphics (ToG) 36(6), 194 (2017).
Liu, L., Xu, W., Habermann, M., Zollhoefer, M., Bernard, F., Kim, H., Wang, W., Theobalt, C.: Neural human video rendering: Joint learning of dynamic textures and rendering-to-video translation. arXiv preprint arXiv:2001.04947 (Mar. 2020).
Liu, S., Li, T., Chen, W., Li, H.: Soft rasterizer: A di_erentiable renderer for image-based 3D reasoning. In: Proceedings of the IEEE International Conference on Computer Vision. pp. 7708(7717(2019).
Lombardi, S., Saragih, J., Simon, T., Sheikh, Y.: Deep appearance models for face rendering. ACM Transactions on Graphics (TOG) 37(4), 1{13 (2018).
Lombardi, S., Simon, T., Saragih, J., Schwartz, G., Lehrmann, A., Sheikh, Y.: Neural volumes: Learning dynamic renderable volumes from images. ACM Transactions on Graphics (TOG) 38(4), 65 (2019).
Loper, M., Mahmood, N., Romero, J., Pons-Moll, G., Black, M.J.: Smpl: A skinned multiperson linear model. ACM transactions on graphics (TOG) 34(6), 1{16 (2015).
Ma, Q., Yang, J., Ranjan, A., Pujades, S., Pons-Moll, G., Tang, S., Black, M.J.: Learning to dress 3D people in generative clothing. arXiv preprint arXiv:1907.13615 (2019).
Mahmood, N., Ghorbani, N., Troje, N.F., Pons-Moll, G., Black, M.J.: Amass: Archive of motion capture as surface shapes. In: Proceedings of the IEEE International Conference on Computer Vision, pp. 5442-5451 (2019).
Martin-Brualla, R., Pandey, R., Yang, S., Pidlypenskyi, P., Taylor, J., Valentin, J., Khamis, S., Davidson, P., Tkach, A., Lincoln, P., et al.: Lookingood: enhancing performance capture with real-time neural re-rendering. arXiv preprint arXiv:1811.05029 (2018) ECCV-20.
Odena, A., Dumoulin, V., Olah, C.: Deconvolution and checkerboard artifacts. Distill (2016), https://doi.org/10.23915/distill.00003, http://distill.pub/2016/deconvcheckerboard.
Paszke, A., Gross, S., Chintala, S., Chanan, G., Yang, E., DeVito, Z., Lin, Z., Desmaison, A., Antiga, L., Lerer, A.: Automatic di_erentiation in pytorch (2017).
Pavlakos, G., Choutas, V., Ghorbani, N., Bolkart, T., Osman, A.A., Tzionas, D., Black, M.J.: Expressive body capture: 3D hands, face, and body from a single image. In: Proceedings of the IEEE Conference on Computer Vision and Pattern Recognition. pp. 10975-10985 (2019).
Pfister, H., Zwicker, M., Van Baar, J., Gross, M.: Surfels: Surface elements as rendering primitives. In: Proceedings of the 27th annual conference on Computer graphics and interactive techniques, pp. 335-342 (2000).

(56) References Cited

OTHER PUBLICATIONS

Pons-Moll, G., Romero, J., Mahmood, N., Black, M.J.: Dyna: A model of dynamic human shape in motion. ACM Transactions on Graphics, (Proc. SIGGRAPH) 34(4), 120:1-120:14 (Aug. 2015).

Romero, J., Tzionas, D., Black, M.J.: Embodied hands: Modeling and capturing hands and bodies together. ACM Transactions on Graphics (ToG) 36(6), 245 (2017).

Ronneberger, O., Fischer, P., Brox, T.: U-net: Convolutional networks for biomedical image segmentation. In: International Conference on Medical image computing and computer-assisted intervention, pp. 234{241. Springer (2015).

Rusinkiewicz, S., Levoy, M.: Qsplat: A multiresolution point rendering system for large meshes. In: Proceedings of the 27th annual conference on Computer graphics and interactive techniques, pp. 343{352 (2000).

Saito, S., Huang, Z., Natsume, R., Morishima, S., Kanazawa, A., Li, H.: Pifu: Pixel-aligned implicit function for high-resolution clothed human digitization. In: The IEEE International Conference on Computer Vision (ICCV) (Oct. 2019).

Shysheya, A., Zakharov, E., Aliev, K.A., Bashirov, R., Burkov, E., Iskakov, K., Ivakhnenko, A., Malkov, Y., Pasechnik, I., Ulyanov, D., Vakhitov, A., Lempitsky, V.: Textured neural avatars. In: The IEEE Conference on Computer Vision and Pattern Recognition (CVPR) (Jun. 2019).

Sitzmann, V., Thies, J., Heide, F., Nie_ner, M., Wetzstein, G., Zollhofer, M.: Deepvoxels: Learning persistent 3D feature embeddings. In: Proceedings of the IEEE Conference on Computer Vision and Pattern Recognition. pp. 2437-2446 (2019).

Sitzmann, V., Zollhofer, M., Wetzstein, G.: Scene representation networks: Continuous 3d-structure-aware neural scene representations. In: Advances in Neural Information Processing Systems (2019).

Thies, J., Zollhofer, M., Niessner, M.: Deferred neural rendering: Image synthesis using neural textures. ACM Transactions on Graphics (TOG) 38(4), 1-12 (2019).

Wang, T.C., Liu, M.Y., Zhu, J.Y., Tao, A., Kautz, J., Catanzaro, B.: High-resolution image synthesis and semantic manipulation with conditional GANs. In: Proceedings of the IEEE conference on computer vision and pattern recognition, pp. 8798-8807 (2018).

Wei, S.E., Saragih, J., Simon, T., Harley, A.W., Lombardi, S., Perdoch, M., Hypes, A., Wang, D., Badino, H., Sheikh, Y.: VR facial animation via multiview image translation. ACM Transactions on Graphics (TOG) 38(4), 1-16 (2019).

Zakharov, E., Shysheya, A., Burkov, E., Lempitsky, V.: Few-shot adversarial learning of realistic neural talking head models. In: Proceedings of the IEEE International Conference on Computer Vision, pp. 9459-9468 (2019) ECCV-20 submission ID 2757.

Zhang, R., Isola, P., Efros, A.A., Shechtman, E., Wang, O.: The unreasonable effectiveness of deep features as a perceptual metric. In: Proceedings of the IEEE Conference on Computer Vision and Pattern Recognition, pp. 586-595 (2018).

Zhou, Y., Hu, L., Xing, J., Chen, W., Kung, H.W., Tong, X., Li, H.: HairNet: Single-view hair reconstruction using convolutional neural networks. In: Proceedings of the European Conference on Computer Vision (ECCV). pp. 235-251 (2018).

\* cited by examiner

IMAGE GENERATION FROM 3D MODEL USING NEURAL NETWORK

BACKGROUND

Traditional graphics pipelines for rendering or animating human bodies and/or human faces typically rely on parameterized and editable representations of three-dimensional ("3D") shape (e.g., a 3D mesh) and the ability to control various aspects of a 3D model and virtual environment data (e.g., pose, lighting, material properties, virtual camera position, etc.). While photorealism is possible with such classical 3D rendering and animation methods, realism typically comes at the expense of complex systems to capture detailed shape and reflectance, and/or significant human input from an animator. There are additional drawbacks of traditional mesh-based rendering methods in terms of rendering complex, high-frequency geometry (such as hair, wrinkles on clothing, etc.) and handling complex, changing topology.

Recent developments in deep learning and the evolution of graphics processing units has introduced new tools for human modeling, animation and synthesis. Models based on generative adversarial networks ("GANs") have reached previously infeasible levels of realism in synthesizing human faces. While promising, particularly in terms of their realism, these new "neural" approaches (e.g., employing a neural network-based generative model) to synthesizing images of humans have several drawbacks relative to classical methods, such as the traditional graphics pipelines referred to above. For example, neural-based or similar machine learning approaches to image generation, such as those based on a GAN architecture, typically lack the ability to fully and flexibly control the generative process, such as changing the camera view, lighting, or pose of the subject. One result of these problems is that such methods are typically not appropriate for generating animation due to the inability to render successive frames or views of a given subject in a manner that appears consistent to a viewer.

BRIEF DESCRIPTION OF DRAWINGS

Embodiments of various inventive features will now be described with reference to the following drawings. The drawings are provided to illustrate example embodiments described herein and are not intended to limit the scope of the disclosure.

DETAILED DESCRIPTION

Figure 1:
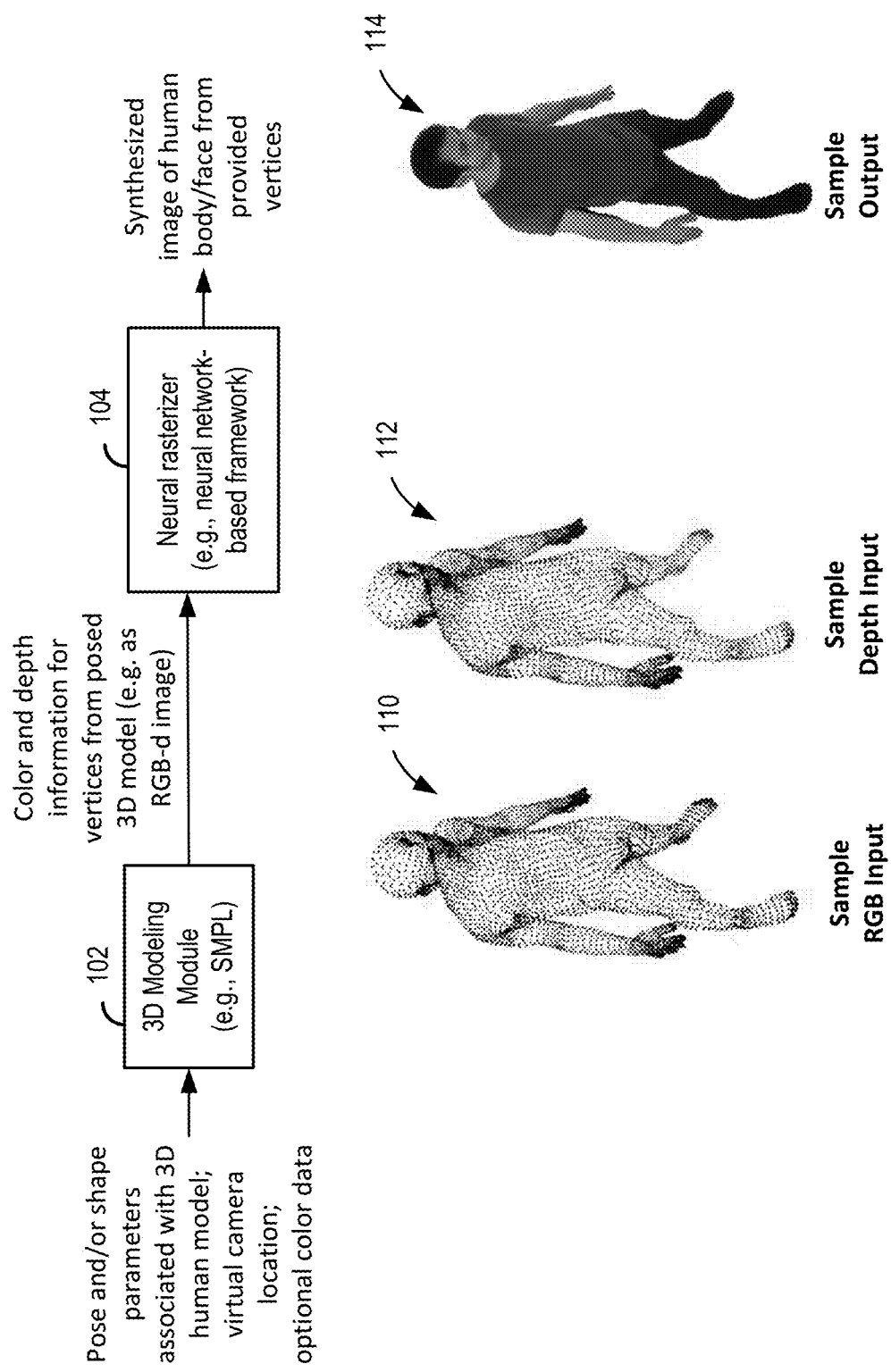
FIG. 1 is a block diagram illustrating an example high level flow of data and example visual representations at different points during a process of generating or synthesizing a realistic image of a human, according to some embodiments.

Generally described, aspects of the present disclosure relate to a neural rasterizer capable of translating a sparse set of 3D points to realistic images by reconstructing projected surfaces directly in the pixel space without relying on a traditional 3D rendering pipeline. Approaches are described herein providing for parameterized control features (such as 3D body shape, pose and/or virtual camera position) typically associated with traditional 3D model rendering pipelines with other advantages that are typically provided by separate neural point-based rendering. Aspects of the present disclosure enable a neural network model or other trained machine learning model (or series of related models) to effectively replace traditional 3D rendering components that are typically employed with 3D mesh-based rendering processes. As will be described herein, a GAN or other neural network-based model (which will often be described herein as a neural rasterizer) may be trained to render a human body and/or human face directly in the image space from a sparsely populated input image that includes color and depth information for a relatively small number of initially populated pixel locations. The sparse initially populated pixel data may be provided from 3D mesh vertices or similar data by a 3D modeling component that may generate input images provided to the neural rasterizer.

Aspects of the present disclosure enable a computing system to generate realistic images of clothed or unclothed bodies that can be controlled in terms of pose, shape and/or camera angle, without relying on a full traditional 3D rendering pipeline. Other system known in the art for generating full human bodies directly in the image space or pixel space (as opposed to relying on a traditional 3D rendering pipeline that renders in virtual 3D space) cannot be controlled in the manners described herein, such as altering body shape and pose in a predictable manner. The methods and systems described herein can be used to generate still images or animation that appears to be photorealistic and to depict real humans, though actually generated based on machine learning. These output images or animations could be used for a variety of purposes, including automatically generating catalog images for a marketplace (e.g., generating images that appear to be photographs of human models wearing clothing or accessories offered for sale), generating frames of a movie with artificially generated actors, demonstrating human movements or body types in motion or any desired positioning, etc.

Recent advances in deep generative models (such as those relying at least in part on a deep neural network) have led to previously unattainable levels of realism of synthetic images of humans. However, one of the remaining fundamental limitations of such existing models is the ability to flexibly control the generative process. For example, existing deep generative models do not allow control of a virtual camera position or pose of the human subject being generated in a manner that maintains or preserves the identity or general appearance of the subject. Conversely, deformable human body models, such as the Skinned Multi-Person Linear ("SMPL") model, have full control over pose and appearance, but rely on classic computer graphics pipelines for rendering. Key drawbacks of these more traditional rendering pipelines include the explicit mesh rasterization step that (a) does not have the potential to fix any artifacts or lack of realism of the original 3D geometry and (b) is not typically fully incorporated into a deep learning framework.

Aspects of the present disclosure bridge the gap between classic geometry-aware rendering and recent advances in generative networks that operate in a pixel space. Such improvements include the use of a neural rasterizer, which may be a trainable neural network module that directly translates a sparse set of 3D mesh vertices to photorealistic images, which may not require any hardwired logic in pixel coloring and occlusion reasoning. The machine learning model implemented as a neural rasterizer described herein (which may also be referred to as a neural rasterization model or module) may be trained as described based on a large corpus of human 3D models and corresponding real photos. In some embodiments, several steps that would typically be performed in traditional 3D rendering pipelines (such as geometric occlusion reasoning and image enhancement) may be replaced by or performed within a single neural network module that is trained to reconstruct projected surfaces directly in the pixel space. These techniques may be easily incorporated into a larger deep learning pipeline if desired. In experimentation, the methods and systems described herein have shown advantages over conventional differentiable renderers both in terms of the level of acquired photorealism and rendering efficiency.

In some embodiments, the 3D mesh-based portions of the image generation pipeline described herein may employ the known Skinned Multi-Person Linear (SMPL) model. The SMPL model is a skinned vertex-based model that accurately represents a wide variety of 3D human body shapes in natural human poses, which deform naturally with pose and exhibit soft-tissue motions like those of real humans. The parameters of the model are learned from data including a rest pose template, blend weights, pose-dependent blend shapes, identity-dependent blend shapes, and a regressor from vertices to joint locations. The SMPL model enables training its entire model from aligned 3D meshes of different people in different poses. Because the SMPL model is based on blend skinning, the model is compatible with many rendering engines. More information regarding implementation of an SMPL model can be found in U.S. Pat. No. 10,395,411 (hereinafter "the '411 Patent"), to Black et al., issued Aug. 27, 2019, entitled "SKINNED MULTI-PERSON LINEAR MODEL," which is incorporated herein by reference.

As described in the '411 Patent, using the SMPL model to generate a 3D human body model in a given instance may generally include, in one embodiment, obtaining a shape-specific template of a body model defined by a number of vertices (where the shape-specific template may have been generated by applying a shape-specific blend shape to vertices of a template shape), applying a pose-dependent blend shape to the vertices of the shape-specific template (e.g., displacing the vertices of the shape-specific template into a pose- and shape-specific template of the body model), and then generating a 3D model articulating a pose of the body model based on the vertices of the pose- and shape-specific template of the body model. Thus, an SMPL-based model may be configured to receive input that includes a vector of shape parameters and a vector of pose parameters, which the SMPL model then applies with respect to a template 3D human model in order to generate a 3D human model that maps the shape and pose parameters to vertices.

Human bodies are often used herein as an example of the underlying subject of both the 3D models described and the resulting synthesized images. However, it will be appreciated that subjects other than human bodies may be used in other embodiments. For example, a subject of a 3D model and ultimate resulting synthesized image according to some embodiments may be a portion of a human (e.g., a hand, a face, a torso, etc.) or an animal. In the case of animal subjects, for example, there are known methods for generating posable animal models that may be used in place of SMPL in embodiments described herein. One such example is described in "3D Menagerie: Modeling the 3D Shape and Pose of Animals," by Zuffi et al., published in the 2017 IEEE Conference on Computer Vision and Pattern Recognition, which describes methods of learning an articulated, 3D statistical shape model of animals using a small amount of training data. In some embodiments in which the subject to be synthesized is a human face with posable or adjustable facial features, SMPL may be replaced in embodiments described herein with the known FLAME model (Faces Learned with an Articulated Model and Expressions). The FLAME model uses a linear shape space trained from scans of human heads, and combines this linear shape space with an articulated jaw, neck, and eyeballs, pose-dependent corrective blend shapes, and additional global expression blend shapes. In still other embodiments, in which the subject of a synthesized image is a human hand, SMPL may be replaced or supplemented with the known MANO model ("hand Model with Articulated and Non-rigid deformations"). MANO is learned from high-resolution 3D scans of hands in a wide variety of hand poses.

FIG. 1 is a block diagram illustrating an example high level flow of data and example visual representations at different points during a process of generating or synthesizing a realistic image of a human, according to some embodiments. A single computing system may implement or include one or more 3D modeling components 102 (such as an SMPL model) as well as a neural rasterizer 104 (such as a neural network-based framework or model). In other embodiments, one computing system may implement the 3D modeling components 102, while another computing system implements the neural rasterizer 104 (such as by receiving output of the 3D modeling module 102 over a network or from a data store accessible to both systems). For ease of description, illustrative methods will be described below with respect to embodiments in which the 3D modeling components and neural rasterizer are implemented by a single computing system, such as computing system 502, but this is not intended to be limiting.

FIG. 1 illustrates data flow for an instance of generating a single image in a test or production run. The training process that enables the neural rasterizer 104 to generate such images will be described further below, such as with respect to FIG. 3. The illustrative data flow begins with the 3D modeling module 102 receiving pose and/or shape parameters associated with a 3D model of a human, as well as virtual camera location information and optional color data (such as at color value, as an RGB value of otherwise, for vertices or other points of a 3D model object, which may have been captured by a camera during 3D scanning of a real human).

In other embodiments, one or more of these inputs may have predefined values or defaults defined within the 3D modeling module, such that they are not required to be provided as explicit input in a given instance. For example, body shape information, camera location and color data may remain constant across a large number of rendering requests (such as if a model's appearance should remain constant or consistent across multiple animation frames or multiple images), with just the pose parameters being altered for each request. As another example, if it is desirable to render multiple different 3D human models in the same pose (such as a neutral standing pose that will be used as catalog images to demonstrate clothing worn by models of different body types), the pose parameters may remain constant (or not provided as explicit input) with the shape parameters and/or 3D model type changing between requests.

In one embodiment, the 3D modeling module 102 may be an SMPL model that takes the inputs shown in FIG. 1 and generates a 3D mesh model of a human articulating the indicated pose, where the body model may be based on a template that is adjusted based on the input parameters (such as body shape parameters). Pose and shape parameters may be provided in a variety of forms known in the art, including those used in association with the known SMPL model. The process internally implemented within the SMPL model is described in detail in the '411 Patent and has been briefly summarized above. In embodiments in which the SMPL model is used, there is no need to specifically train the SMPL model for purposes of operation within the pipeline illustrated in FIG. 1. In other words, a standard pre-trained SMPL model may be used, assuming that the SMPL model has been sufficiently trained for its typical purposes outside of the neural rasterization context of the present disclosure.

In other embodiments, the 3D modeling module 102 may not rely on an SMPL model and may implement an alternative approach to generating 3D point data based on 3D model data and pose and/or shape parameters. For example, other parametric models could be used in other embodiments, rather than an SMPL model. Other model types that could be implemented by the 3D modeling module 102 instead of an SMPL model may include, among others, the frameworks described in "Total Capture: A 3D Deformation Model for Tracking Faces, Hands, and Bodies," by Hanbyul Joo et al.; "Expressive Body Capture: 3D Hands, Face, and Body from a Single Image," by Pavlakos et al.; or a model based on Shape Completion and Animation of People (SCAPE).

As illustrated in FIG. 1, the 3D modeling module 102 may output color and depth information (e.g., virtual distance from a virtual camera) for a number of different vertices or other individual points of the 3D mesh or other 3D body model as posed and shaped according to the 3D modeling module's inputs. In some embodiments, this output of the 3D modeling module 102 that is provided as input to the neural rasterizer 104 may be in the form of an RGB-D image. In other embodiments, a color image file without depth information may be generated by the 3D modeling module, with corresponding depth information for the various pixel locations output as a separate file. An example RGB image output by the 3D modeling module 102 as input to the neural rasterizer 104 is shown in image 110, shown alongside a visualization 112 of corresponding depth information. While an RGB or RGB-D image is used as an example herein, it will be appreciated that other color modes could be used in other embodiments, such as CMYK.

As shown in sample RGB image 110, the majority of the pixel locations in the image may be blank (such as white pixels, transparent pixels, or pixels otherwise having a color value assigned as background or empty). The sparsely populated pixels having color values assigned in the image 110 may correspond to locations of vertices in the 3D mesh posed and shaped by the 3D modeling module 102. In other embodiments, the pixels having color values in the image 110 may correspond to points in a 3D point cloud (or other 3D point data lacking mesh connectivity information) generated by the 3D modeling module 102. What appears as individual points in the image 110 may each be a single pixel in the image 102, or may be a small cluster of adjacent pixels that appear as a point, dot, or other shape. As shown, the populated points of pixels in the image 110 are not uniformly distributed through the image or the represented body. For example, portions of the 3D model that include more detail, shape variation and/or color variation may have more densely populated points in the image 102 in order to improve image synthesis results of the neural rasterizer in those areas of detail (such as, in image 102, the ears, eyes, nose, mouth, and fingers). It will be appreciated that areas of particular interest or detail for image synthesis purposes may be manually or automatically targeted to be populated more densely in the image. This may include areas on clothing, such as if an item of clothing includes artwork, a logo, an intricate pattern, etc.

Each point illustrated in image 110 (which may each correspond to a single pixel, in some embodiments) may have a color value that represents the actual color from a prior 3D scan or associated real captured photo of an actual person, or may be inferred from other real world data (such as images, video, etc. of a real person). For example, an SMPL modeling model (as 3D modeling module 102) may have previously stored actual color values for the vertices of a 3D mesh that were captured from a camera that captured RGB values from a clothed human simultaneously or nearly simultaneously with 3D body scanning of the human that was used in generating a 3D mesh. The 3D modeling module may pass this color data through to the image stage (e.g., without applying any virtual lighting or other traditional 3D rendering modifications), such that the position of a given vertex in an image 110 changes from instance to instance based on inputs to the 3D modeling module 102 (e.g., based on pose parameters, body shape parameters and/or virtual camera location) but the color value remains consistent or constant between instances (assuming there is not a switch to a different 3D base model or body template between instances).

Accordingly, for example, the RGB values of pixels in the image 110 at locations corresponding to the hair of a real human model may be the camera-captured hair color of that real person at that location (e.g., exact or very close to exact location) on the body, the RGB values of pixels in the image 110 at locations corresponding to a shirt worn by the real human during capture may be the camera-captured color of that shirt or other clothing item at that location, etc. Colors displayed in the corresponding depth information 112, by contrast, are not intended to be interpreted as literal colors of body locations, but rather depth information 112 is simply visually represented in FIG. 1 as colors for illustrative purposes (e.g., as RGB values along a spectrum that represent relative depth or distance from the camera). It will be appreciated that while the RGB values of a given vertex (e.g., a particular precise position on the left wrist of the 3D body model) in an image (such as image 110) output by the 3D modeling module 102 may stay constant across pose variations, the corresponding depth value at that pixel location (as represented by depth information 112) would change based on certain pose parameter changes (e.g., the model's left hand moving and/or rotating towards or away from the virtual camera) or virtual camera location changes (e.g., to view the model from a different angle), etc.

As further illustrated in FIG. 1, the color and depth information for vertices from the posed 3D model (e.g., as RGB-D image data output by the 3D modeling module 102) may be provided as input to a trained neural rasterizer 104 (such as a deep neural network, as described further below) that generates a synthesized full image of the subject body form that was sparsely populated in the input image 110. In some embodiments, the neural rasterizer may effectively "fill out" the sparse representation of the human in input image 110 by replacing many blank pixels from the input image 110 with color values determined by the neural rasterizer (without the neural rasterizer having access to the underlying 3D mesh or more complete 3D body representation that was previously used by the 3D modeling module 102). In some embodiments or instances, the originally populated pixels from the sample image 110 (e.g., corresponding to vertices of a 3D mesh) may keep their original color values in the output image 114 generated by the neural rasterizer 104. In other embodiments or instances, one or more of the original color values corresponding to vertices in the input image 110 may be changed by the neural rasterizer 104 in the output image 114. The operation and training of the neural rasterizer 104 will be further described below, such as with reference to FIGS. 3 and 4.

As will be appreciated based on the above, while a 3D modeling module 102 (such as an SMPL model) is employed in the data image generation pipeline of FIG. 1, the ultimate rendering of an image of a human is not accomplished via traditional 3D mesh-based rendering approaches. For example, instead of relying on mesh connectivity for explicit rendering of 3D surfaces defined by the mesh, the 3D modeling module 102 may employ 3D mesh vertices and their colors projected onto image plane as inputs for the neural rasterizer 104, with the image generation from that point forward in the pipeline being handled entirely in the 2D image space. This provides the benefits of a parameterized body model, while greatly improving the rendering quality, without the complexity of classical 3D rendering methods.

The illustrated embodiment described with respect to FIG. 1 relies in part on the structured nature of mesh vertices to control the generative process, but the mesh connectivity is not directly used. The system instead treats vertices essentially as unstructured point clouds. Compared with explicit mesh rasterization approaches, an advantage of this vertices-as-points approach, along with its computational and conceptual simplicity, is the ability of the trained neural rasterizer to reproduce complex high frequency surfaces directly in the pixel space. In some embodiments, the 3D modeling module 102 may not even rely on any mesh connectivity information, and instead use available 3D anchor points unrelated to an explicitly defined mesh, for example.

Figure 2A:
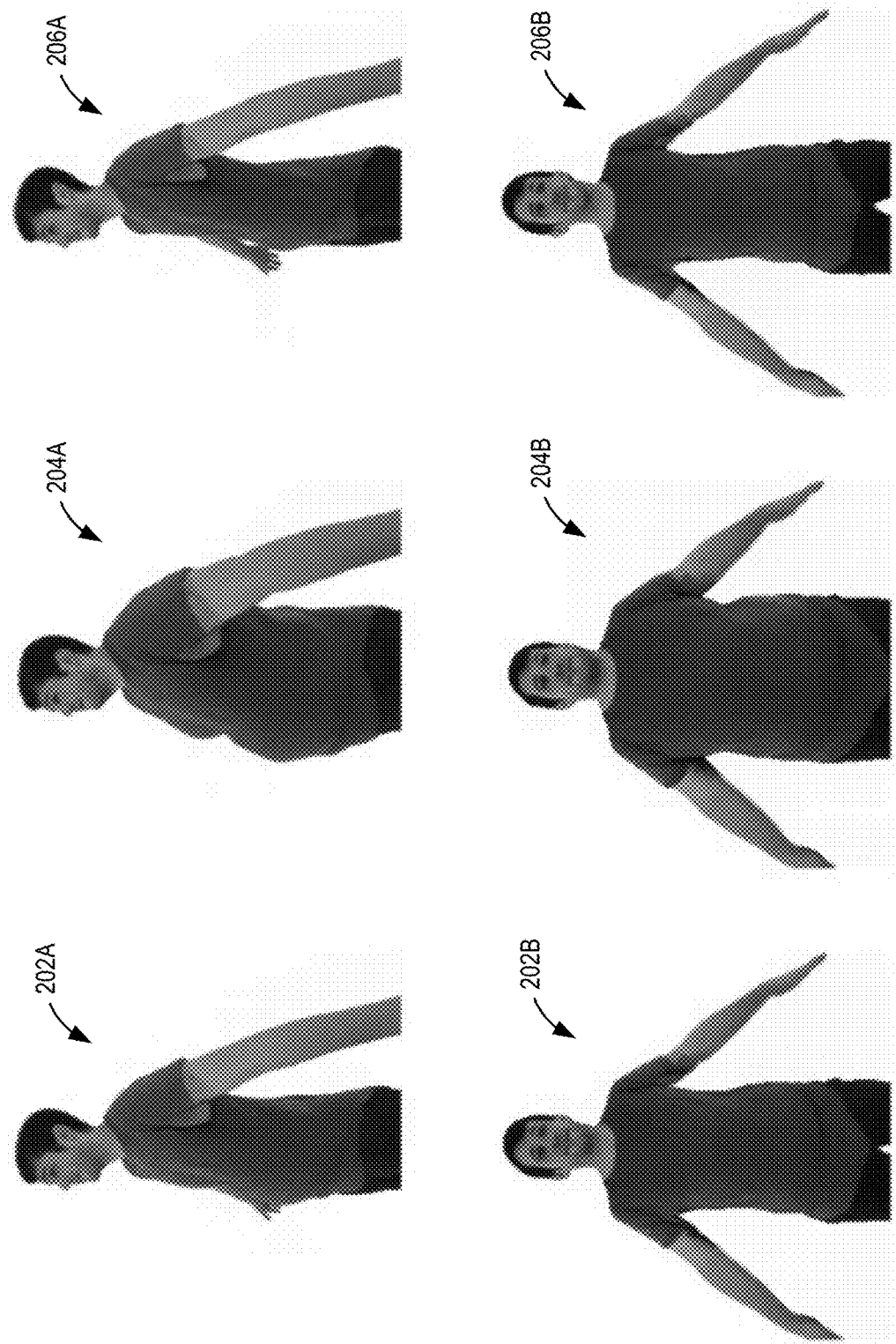
FIG. 2A provides various sample output images generated by a neural rasterizer based on different pose and body shape parameters being applied by a 3D modeling component that generated input to the neural rasterizer, according to some embodiments.

FIG. 2A provides various sample output images generated by a neural rasterizer based on different pose and body shape parameters being applied by a 3D modeling component that generated input to the neural rasterizer, according to some embodiments. The sample output images shown in FIG. 2A may have each been generated based on the same underlying 3D body template (at the 3D modeling module stage described above). However, for the pass through the flow of FIG. 1 described above for each of images 202A, 204A and 206A, the SMPL model or other 3D modeling module applied different body shape parameters to give the appearance of a thinner or heavier body type. Sample output images 202B, 204B and 206B may have had the same input body shape parameters as sample output images 202A, 204A and 206A respectively, but with a change in the virtual camera location or body pose parameters that cause the view of the model to be facing a different direction relative to the virtual camera.

Figure 2B:
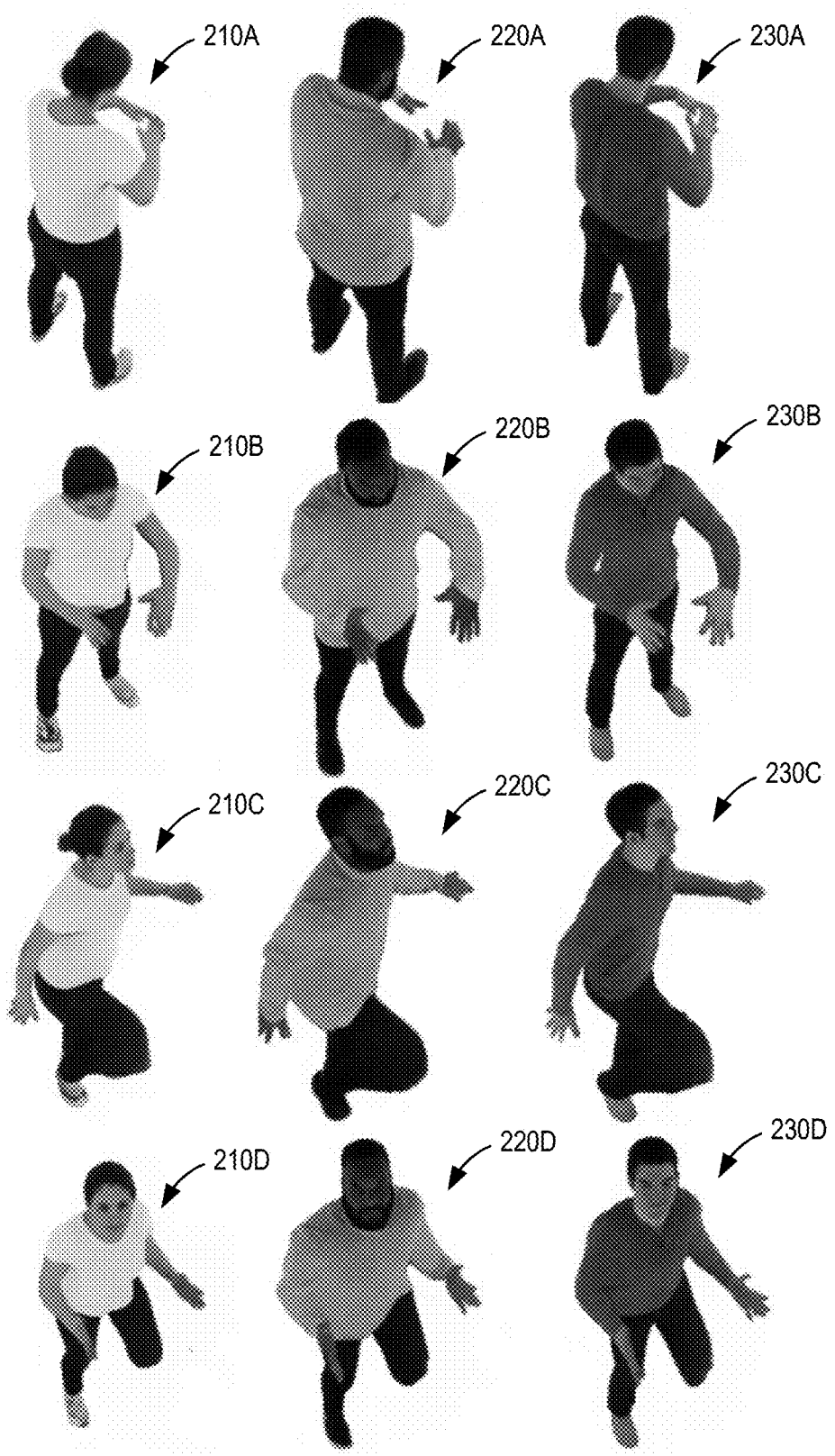
FIG. 2B provides various sample output images generated by a neural rasterizer based on different pose parameters and 3D model data being used by a 3D modeling component that generated input to the neural rasterizer, according to some embodiments.

FIG. 2B provides various sample output images generated by a neural rasterizer based on different pose parameters and 3D model data being used by a 3D modeling component that generated input to the neural rasterizer, according to some embodiments. FIG. 2B includes twelve sample output images of the same neural rasterizer 104, with four images being based on the 3D modeling module using a first female body template (shown in output images 210A, 210B, 210C and 210D), another four images being based on the 3D modeling module using a first male body template (shown in output images 220A, 220B, 220C and 220D), and another four images being based on the 3D modeling module using a second male body template (shown in output images 230A, 230B, 230C and 230D).

As shown, each of the different body templates has had the same series of pose parameters and virtual camera locations used by the 3D modeling module (e.g., the synthesized human in image 210B has the same pose as the synthesized humans in images 220B and 230B). It will be appreciated that the image series corresponding to each body template may be frames from a longer video or animation, where the pose and camera change occurs gradually and smoothly over many frames not illustrated, such that each synthesized human's identity appears constant throughout an animation of successive separately generated images by the neural rasterizer. Further, the neural rasterizer is not provided information regarding which body template or model was used by the 3D modeling module 102 in generating the input images to the neural rasterizer, nor is it necessary that the neural rasterizer ever see input images corresponding to the particular body template during training (provided that the neural rasterizer was trained with a sufficient breadth of training examples).

Figure 3:
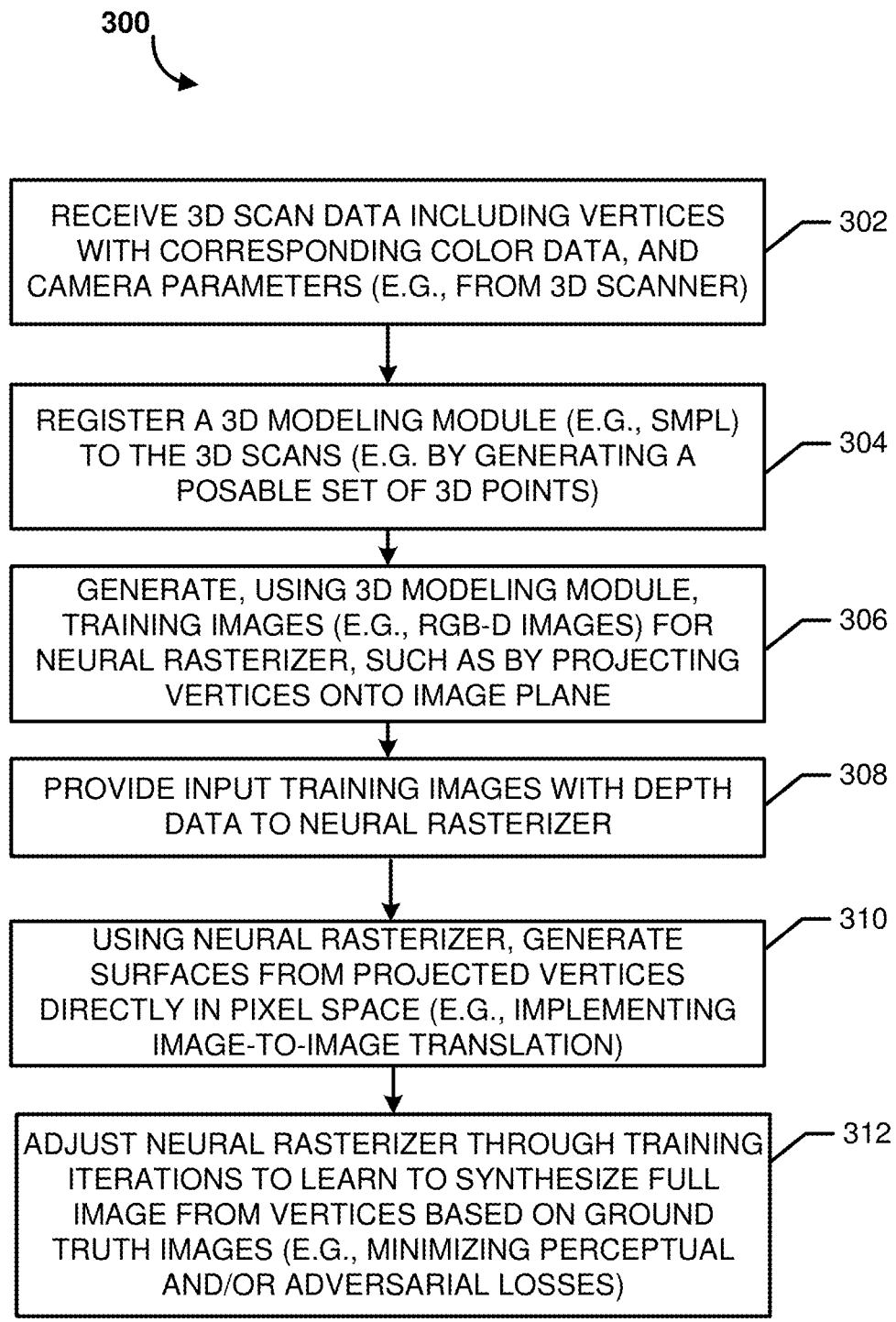
FIG. 3 is a flow diagram of an illustrative method for training a neural rasterizer to generate an image of a human body based on a sparsely populated input image with corresponding depth information.

FIG. 3 is a flow diagram of an illustrative method 300 for training a neural rasterizer to generate an image of a human body based on a sparsely populated input image with corresponding depth information. The method 300 may be implemented by one or more computing systems, such as computing system 502 that will be described below with respect to FIG. 5. In some embodiments, a computing system other than the system that trains the neural rasterizer (such as by implementing method 300) may later utilize a trained neural rasterizer to generate images (such as by implemented method 400 described further below). In other embodiments, the same computing system may train and later use the neural rasterizer (e.g., implement both method 300 followed by potentially many iterations of method 400 described below).

At block 302, in some embodiments, real captured body data and corresponding color and camera position data may be obtained from a 3D scanner, such as any of various commercially available 3D scanners. In some embodiments, the 3D scan data may have been previously captured by some other computing system or party, such as by the computing system accessing a data store that stores a large corpus of 3D model data captured from 3D scans. At block 304, an SMPL model may be registered to the scans, though other models (such as another model able to represent a human body as a posable set of points in 3D space, such as a 3D mesh or point cloud, in order to determine position and depth of various points on the body) can be used instead of SMPL in other embodiments. The result of registering the SMPL model to the scan data may be a set of mesh vertices, the RGB color of each vertex, and body pose parameters (as further discussed above). The registration process may have some inaccuracies or precision problems in certain areas, such as issues in fitting hair (due to the irregularity of hair and relatively low resolution of the SMPL model) or fitting clothing (due to the form-fitting topology of SMPL, for instance). An advantage of using the registered vertices over raw scan data, however, is enabling control of the pose of the vertices by varying a small set of inferred pose parameters.

At block 306, the 3D modeling module generates input training images (such as RGB-D image data) for the neural rasterizer, such as by projecting vertices of a 3D mesh onto an image plane using a camera model. The computing system may project the vertices of the body model using ground truth scanner camera location information, in some embodiments, to generate an RGB-D image of the projected vertices. Prior to projecting the vertices to create an input training image, the computing system may sort vertices that share the same 2D pixel space coordinates by their depth value and only project the one closest to the camera. However, because the number of vertices is much smaller than the full resolution of the image plane, such collisions rarely occur in practice.

The input training images generated by the 3D modeling module may each be paired in the training data for the neural rasterizer with a corresponding ground truth image (e.g., an actual digital photograph of the real human subject captured in the 3D scanning process). In some embodiments, the computing system may alter the ground truth image to remove background or other image data that should not be learned by the neural rasterizer. For example, the computing system may apply image segmentation techniques to the captured ground truth images to replace pixels corresponding to the background with white or some other default color.

Next, at block 308, the computing system may provide the generated training data to the neural rasterizer. As discussed above, the training data may include the generated training image data (e.g., color and depth at certain vertices or other sparsely populated points) and corresponding ground truth images (e.g., an actual captured image from a scanner or camera). In some embodiments, additional data or metadata (other than color and depth information mentioned above) may be included for one or more points as projected in the training image data. For example, the computing system may include data such as the normal (on the surface of a 3D mesh, for example) at various projected vertices or other projected points. As another example, the computing system may include labels, classifications or descriptors associated with individual projected points (such as labeling that a given point corresponds to a human hand, a point corresponds to human hair, a point corresponds to a dog's nose, etc.).

At block 310, the neural rasterizer of the computing system attempts to generate or reconstruct surfaces from projected vertices directly in the pixel space (e.g., using image-to-image or pixel-to-pixel translation techniques). In some embodiments, the neural rasterizer may be a deep neural network (such as a UNet-based neural network) trained to map the input of RGB-D projection images (e.g., depicting vertices' color and depth information, as discussed above) to segmented output images. In one embodiment, a generally available UNet architecture may be used (such as the PyTorch implementation, in one embodiment) with potential modifications. For example, transposed convolutions in the UNet model may be replaced with up-sample convolutions, which may avoid checkerboard artifacts. The UNet model may be further modified for optimization or tailoring to a specific target image resolution.

The neural rasterizer may additionally employ a GAN architecture or other adversarial component in training. For example, the neural rasterizer may include both a generator (which may include neural network architecture mentioned above) that generates a candidate synthesized image that is then passed to a discriminator within the GAN model to assess whether the discriminator determines that the generated image appears acceptable (such as whether the generator has "fooled" the GAN into identifying the synthesized image as an image of a real human). As known with GAN arrangements generally, if a particular candidate image generated by the generator does not pass the discriminator's test, negative feedback is provided to the generator, which then tries again. In some embodiments, the discriminator may be implemented as a fully convolutional neural network, among other options, which is trained at the same time as the generator. In some embodiments, the discriminator of the GAN may not be considered part of the neural rasterizer (which may refer to a generator within the GAN framework), and the discriminator may only be used in training for loss function purposes in some such embodiments. It will be appreciated that a GAN architecture is not required in other embodiments, which may rely on one or more loss functions in training that are not based on an adversarial arrangement.

As illustrated at block 312, the computing system may apply a learning process whereby the computing system adjusts the neural rasterizer (such as adjusting weights in a neural network training process) through training iterations to learn to generate full two-dimensional renderings from vertices based on ground truth images. In some embodiments, this may be accomplished by aiming to minimize perceptual and/or adversarial losses. In some embodiments, the neural rasterizer training may attempt to minimize the combination of the perceptual and adversarial losses with respect to a ground truth training image, such as an actual captured image of a real human captured simultaneously or nearly simultaneously with 3D body scan data that was used by the 3D modeling module to generate training image and depth data. In some embodiments, having the ground truth image for a given subject and camera pose, the neural rasterizer may be optimized for a weighted combination of perceptual loss (such as VGG perceptual loss) and GAN loss (such as multi-scale patch-based GAN loss and/or feature matching GAN loss). It will be appreciated that other loss functions may be employed in various embodiments, and that various loss weighting schemes may be employed.

Implicitly, the machine learning model of the neural rasterizer (such as a deep convolutional neural network) learns to accomplish several tasks. First, in some embodiments, the model learns some form of geometric reasoning, such as learning to ignore certain projected vertices based on their depth values. In that sense, it substitutes fixed-logic differentiable mesh rendering procedures of some prior art systems with a flexible, task-specific neural equivalent. Second, in some embodiments, the model learns how to synthesize realistic textures based on a sparse supervision provided by the projected vertices, as well as to hallucinate entire areas of the image not properly captured by the 3D geometry (which may include hair and clothing) to match the real ground truth images. For these and other reasons, the neural rasterization approach described herein results is improved results in terms of photorealism over many prior art approaches (such as those with explicit fixed differentiable mesh rendering), while also being easier to integrate within larger machine learning pipelines and more computationally flexible.

The learning process may be repeated over many different pairs of training images associated with many different body templates in order to train a neural rasterizer that is capable of synthesizing images of humans with a variety of appearances, a variety of poses, and from a variety of camera angles. Once trained, the neural rasterizer may be generalized such that it can generate realistic images based on previously unseen subjects, body poses, and/or camera parameters (e.g., from input RGB-D image data that was generated based on a mesh, pose, and/or camera position that was not provided in any training data during the training process).

Figure 4:
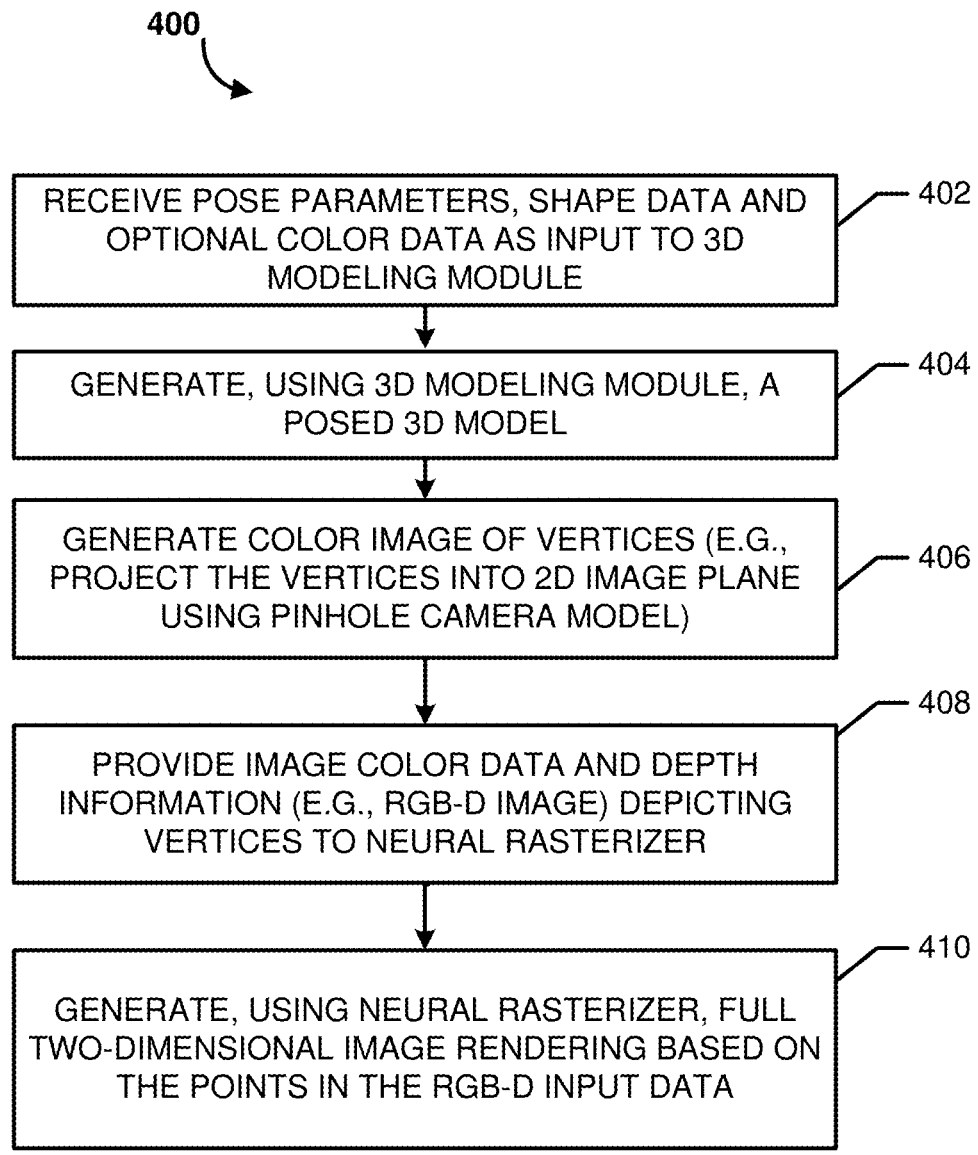
FIG. 4 is a flow diagram of an illustrative method for generating, using a trained neural rasterizer, an image of a human body or other form based on a partially populated input image with corresponding depth information.

FIG. 4 is a flow diagram of an illustrative method 400 for generating, using a trained neural rasterizer, an image of a human body or other form based on a partially populated input image with corresponding depth information. The method 400 may be implemented by one or more computing systems, such as computing system 502 that will be described below with respect to FIG. 5. Functionality of the various blocks of method 400 correspond to features and functionality previously described above with respect to, for example, FIGS. 1 and 3. Accordingly, the blocks of FIG. 4 will only be briefly discussed below.

At block 402, the computing system receives pose parameters, shape data and optional color data as input to a 3D modeling module. This block is described in detail above with respect to FIG. 1, such as with respect to an SMPL model. At block 404, the 3D modeling module may then generate a posed 3D model according to the provided input parameters, as described above with respect to FIG. 1. As described above, the 3D modeling module may then, at block 406, generate a color image depicting the vertices, which may be sparsely populated at the pixel level. For example, in one embodiment, the populated pixels may occupy less than 10% of the available pixel space within the body shape of the subject in the image data (such as projecting 7,000 vertices to a 300 pixel by 400 pixel image space). The image may be generated, for example, by projecting the vertices (originally defined by three dimensional coordinates) into a 2D image plane, such as using a traditional pinhole camera model.

As discussed, the populated points could be points on the surface of the 3D model other than vertices. For example, a particular area of the model without significant surface shape changes may nonetheless include color details that cause that area to be more densely populated at the pixel level in the input image than would be suggested by the number of vertices in the area (such as a graphic or pattern on an item of clothing that should be synthesized in the final image). While the initial image generated at block 406 may be sparsely populated in some embodiments, that may not be the case in other embodiments. For example, a densely populated image may be generated at block 406, and then the realism of the image improved at block 410 (such as by altering color values of populated pixels without necessarily filling in any pixel space that was blank in the initially generated image). In cases where the initial image includes more colored pixels than vertices in the 3D model, the 3D mesh may be upsampled before projecting points to the image space.

At block 408, the computing system may provide the sparsely populated image and depth output of the 3D modeling module as input to a neural rasterizer, which has been previously trained (such as according to method 300 above).

As has been described above, the neural rasterizer then generates a full two-dimensional realistic image of a human based on the sparsely represented points in the input data (such as RGB-D input data). The computing system may then store the image in a data store for various uses, such as printing, incorporating into a frame of a video file, incorporating into a network-accessible resource such as a webpage (e.g., as an automatically generated catalog image for an electronic catalog), and/or other desired use. In some embodiments, method 400 could be repeated with different input data to generate an image that appears to be a different human (such as by using a different body model template within block 404), an image that appears as a next frame in animation of the same synthesized human moving (e.g., by changing pose parameters at block 402), and/or with other changes in the input data in the subsequent iteration(s).

Figure 5:
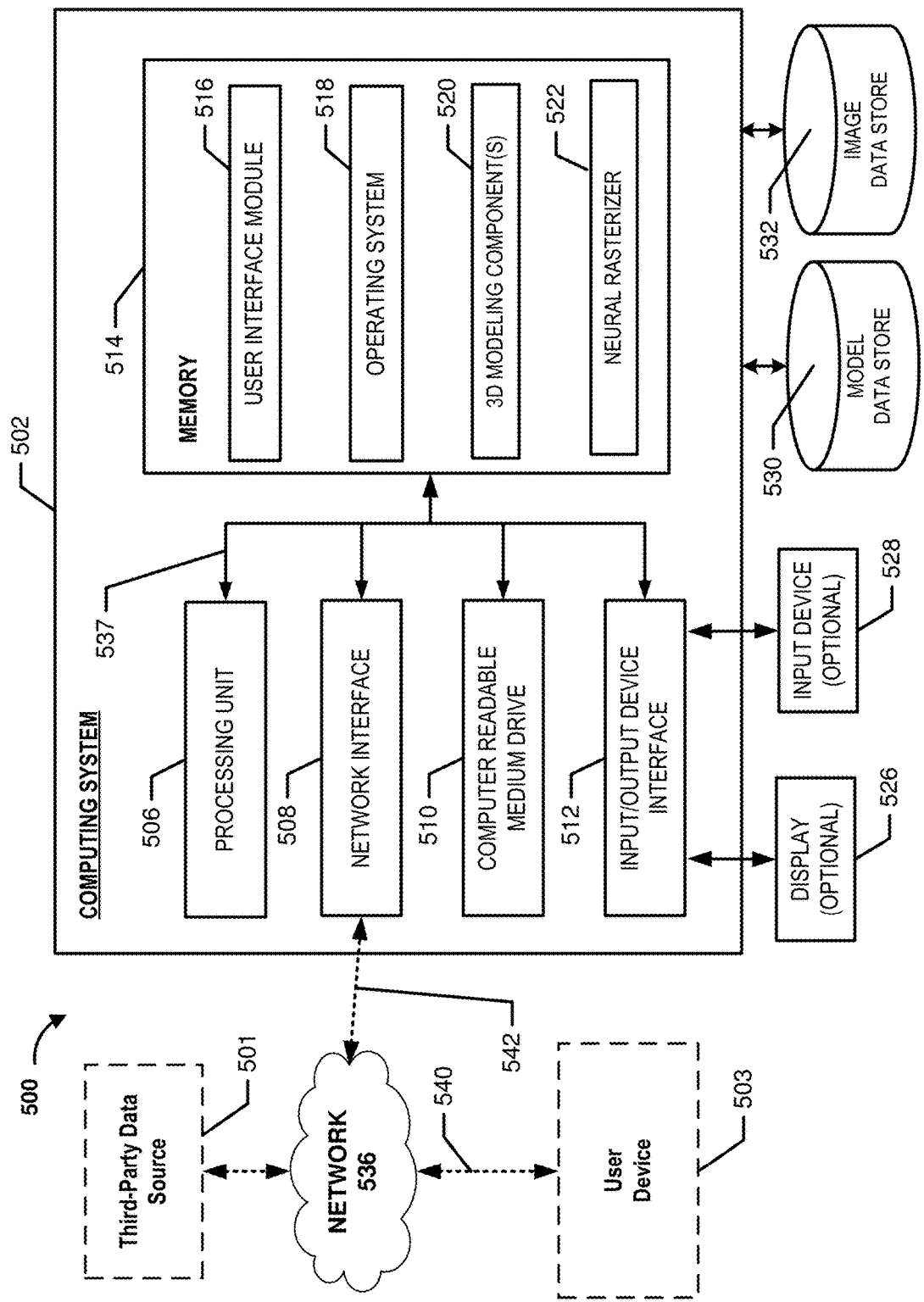
FIG. 5 is a block diagram depicting an illustrative architecture for a computing system that may implement one or more of the features described herein.

FIG. 5 illustrates a general architecture of a computing environment 500, according to some embodiments. As depicted in FIG. 5, the computing environment 500 may include a computing system 502. The general architecture of the computing system 502 may include an arrangement of computer hardware and software components used to implement aspects of the present disclosure. The computing system 502 may include many more (or fewer) elements than those shown in FIG. 5.

As illustrated, the computing system 502 includes a processing unit 506, a network interface 508, a computer readable medium drive 510, an input/output device interface 512, an optional display 526, and an optional input device 528, all of which may communicate with one another by way of a communication bus 537. The processing unit 506 may communicate to and from memory 514 and may provide output information for the optional display 526 via the input/output device interface 512. The input/output device interface 512 may also accept input from the optional input device 528, such as a keyboard, mouse, digital pen, microphone, touch screen, gesture recognition system, voice recognition system, or other input device known in the art.

The memory 514 may contain computer program instructions (grouped as modules or components in some embodiments) that the processing unit 506 may execute in order to implement one or more embodiments described herein. The memory 514 may generally include RAM, ROM and/or other persistent, auxiliary or non-transitory computer-readable media. The memory 514 may store an operating system 518 that provides computer program instructions for use by the processing unit 506 in the general administration and operation of the computing system 502. The memory 514 may further include computer program instructions and other information for implementing aspects of the present disclosure. For example, in one embodiment, the memory 514 may include a user interface module 516 that generates user interfaces (and/or instructions therefor) for display upon a computing system, e.g., via a navigation interface such as a browser or application installed on the annotating user device 503.

In some embodiments, the memory 514 may include one or more 3D modeling and neural rasterization components, such as 3D modeling component(s) 520 and neural rasterizer 522, which may be executed by the processing unit 506 to perform operations according to various embodiments described herein. The modules or components 520 and/or 522 may access the model data store 530 and/or image data store 532 in order to retrieve data described above and/or store data. The data stores 530 and/or 532 may be part of the computing system 502, remote from the computing system 502, and/or may be a network-based service.

In some embodiments, the network interface 508 may provide connectivity to one or more networks or computing systems, and the processing unit 506 may receive information and instructions from other computing systems or services via one or more networks. In the example illustrated in FIG. 5, the network interface 508 may be in communication with a user device 503 via the network 536, such as the Internet. In particular, the computing system 502 may establish a communication link 542 with a network 536 (e.g., using known protocols) in order to send communications to the computing device 503 over the network 536. Similarly, the computing device 503 may send communications to the computing system 502 over the network 536 via a wired or wireless communication link 540. In some embodiments, the computing system 502 may additionally communicate via the network 536 with an optional third-party data source 501, which may be used by the computing system 502 to retrieve 3D body scan data, 3D mesh data, other 3D human model data, ground truth image data associated with a 3D scan or 3D mesh, various training data described above for an SMPL model and/or for a neural rasterizer, a fully trained SMPL model, and/or other data.

Those skilled in the art will recognize that the computing system 502 and user device 503 may be any of a number of computing systems or devices including, but not limited to, a laptop, a personal computer, a personal digital assistant (PDA), a hybrid PDA/mobile phone, a mobile phone, a smartphone, a wearable computing device, a digital media player, a tablet computer, a gaming console or controller, a kiosk, an augmented reality device, another wireless device, a set-top or other television box, one or more servers, and the like. The user device 503 may include similar hardware to that illustrated as being included in computing system 502, such as a display, processing unit, network interface, memory, operating system, etc.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a non-transitory data store that stores a three-dimensional ("3D") model depicting a human body;
at least one computing device configured with computer-executable instructions that, when executed, cause the at least one computing device to:
generate a plurality of training images for training a neural rasterization model, wherein an individual training image of the plurality of training images comprises a plurality of pixels at locations in the individual training image corresponding to vertices of the 3D model, wherein the plurality of pixels corresponding to the vertices are each (a) assigned color values previously associated with a corresponding vertex of the 3D model, wherein a majority of pixels in the individual training image are assigned a color value representing unpopulated pixel locations, wherein each training image is associated with depth information regarding the vertices;
based at least in part on the plurality of training images, train the neural rasterization model to generate synthesized images of a human in a two-dimensional image space, wherein the neural rasterization model comprises a deep neural network;
subsequent to training of the neural rasterization model:
receive input pose parameters and body shape parameters;
generate a posed 3D model based at least in part by applying the input pose parameters and body shape parameters to the 3D model;

generate an input image for providing to the neural rasterization model that includes a plurality of colored pixels at locations in the input image corresponding to at least a subset of vertices of the posed 3D model, wherein a majority of pixels in the input image are assigned the color value representing unpopulated pixel locations, wherein the input image is associated with depth information regarding the at least a subset of the vertices; and generate, using the neural rasterization model based on the input image, a synthesized image of a human that reflects the input pose parameters and body shape parameters, wherein the neural rasterization model generates the synthesized image from the input image without accessing (a) the posed 3D model, (b) the input pose parameters or (c) the body shape parameters.

2. The system of claim 1, wherein neural rasterization model includes or operates within a generative adversarial network.

3. The system of claim 1, wherein color values for the plurality of colored pixels in the input image are based on real world color data captured in association with a 3D scan of a real human.

4. The system of claim 1, wherein the colored pixels at locations in the input image corresponding to the at least a subset of the vertices of the posed 3D model appear as unstructured points in the input image without any indication within the input image of connections between individual vertices.

5. A computer-implemented method comprising:
receiving input pose parameters associated with a three-dimensional ("3D") model;
generating a posed 3D model based at least in part by applying the input pose parameters to the 3D model;
generating an input image for providing to a neural rasterization model, wherein the input image includes a plurality of colored pixels at locations in the input image corresponding to at least a subset of vertices of the posed 3D model, wherein the input image is associated with corresponding depth information associated with the locations in the input image, wherein the neural rasterization model comprises a neural network; and
generating, using the neural rasterization model based on the input image and the corresponding depth information, a synthesized image, wherein a majority of pixel locations that are assigned color values by the neural rasterization model in the synthesized image differ from color values at corresponding pixel locations in the input image.

6. The computer-implemented method of claim 5, wherein the plurality of colored pixels at locations in the input image corresponding to the at least a subset of vertices of the posed 3D model occupy less than ten percent of available pixel space within a two-dimensional projection of the posed 3D model in image space of the input image, wherein pixels in the input image other than the colored pixels are assigned a value that the neural rasterization model recognizes as not representing color information.

7. The computer-implemented method of claim 5 further comprising:
receiving input body shape parameters,
wherein generating the posed 3D model further includes applying the input body shape parameters to the 3D model.

8. The computer-implemented method of claim 5, wherein the input image comprises an RGB-D image that includes the corresponding depth information.

9. The computer-implemented method of claim 5, wherein the neural rasterization model generates the synthesized image from the input image without accessing the posed 3D model and without accessing the input pose parameters.

10. The computer-implemented method of claim 5, wherein the neural rasterization model includes or operates within a generative adversarial network.

11. The computer-implemented method of claim 5 further comprising, prior to receiving the input pose parameters:
generating a plurality of training images for training the neural rasterization model, wherein an individual training image of the plurality of training images comprises a plurality of pixels at locations in the individual training image corresponding to vertices of a 3D mesh template, wherein the plurality of pixels corresponding to the vertices are each assigned color values previously associated with a corresponding vertex of the 3D mesh template, wherein each training image is associated with depth information regarding the vertices; and
based at least in part on the plurality of training images, training the neural rasterization model to generate synthesized images.

12. The computer-implemented method of claim 11, wherein training the neural rasterization model is further based on a plurality of ground truth images paired with corresponding training images of the plurality of training images, wherein the ground truth images depict a real world subject as captured by a camera.

13. The computer-implemented method of claim 5, wherein color values for the plurality of colored pixels in the input image are based on real world color data captured in association with a photograph, video or 3D scan of a real subject.

14. The computer-implemented method of claim 5 further comprising generating a plurality of synthesized images of a subject as frames of animation, wherein an identity of the subject appears constant in the plurality of images, wherein a pose of the subject in successive frames is changed based on changes to the input pose parameters provided in successive image generation requests to the neural rasterization model.

15. A system comprising:
a non-transitory data store that stores a three-dimensional ("3D") model; at least one computing device configured with computer-executable instructions that, when executed, cause the at least one computing device to:
receive input pose parameters associated with the 3D model;
generate a posed 3D model based at least in part by applying the input pose parameters to the 3D model;
generate an input image for providing to a neural rasterization model, wherein the input image includes a plurality of colored pixels at locations in the input image corresponding to a subset of points on the posed 3D model, wherein the input image is associated with corresponding depth information associated with the locations in the input image, wherein the neural rasterization model comprises a neural network; and
generate, using the neural rasterization model based on the input image and the corresponding depth information, a synthesized image, wherein a majority of pixel locations that are assigned color values by the neural rasterization model in the synthesized image differ from color values at corresponding pixel locations in the input image.

16. The system of claim 15, wherein the at least one computing device is further configured to:
   generate a second posed 3D model based at least in part by applying the input pose parameters to a second 3D model;
   generate a second input image to the neural rasterization model based on the second posed 3D model; and
   generate a second synthesized image from the second input image using the neural rasterization model, wherein the second synthesized image appears to depict a different subject in a same pose as a subject in the synthesized image.

17. The system of claim 15, wherein the synthesized image includes depiction of a clothed full human body and face from a particular viewpoint.

18. The system of claim 17, wherein the particular viewpoint is defined by input camera parameters defining a position of a virtual camera with respect to the posed 3D model, wherein the input camera parameters are applied by the system when generating the input image.

19. The system of claim 15, wherein the at least one computing device is further configured to:
   generate a second posed 3D model based at least in part by applying input body shape parameters to the 3D model;
   generate a second input image to the neural rasterization model based on the second posed 3D model; and
   generate a second synthesized image from the second input image using the neural rasterization model, where a second body shape of a subject as depicted in the second synthesized image is different than a body shape of the subject as depicted in the synthesized image.

20. The system of claim 15, wherein the at least one computing device is further configured to train the neural rasterization model based on training data generated from 3D body scans of a plurality of real subjects.

* * * * *